US011928754B2

(12) United States Patent
Gruber

(10) Patent No.: US 11,928,754 B2
(45) Date of Patent: Mar. 12, 2024

(54) GPU WAVE-TO-WAVE OPTIMIZATION

(71) Applicant: QUALCOMM Incorporated, San Diego, CA (US)

(72) Inventor: Andrew Evan Gruber, Arlington, MA (US)

(73) Assignee: QUALCOMM Incorporated, San Diego, CA (US)

(*) Notice: Subject to any disclaimer, the term of this patent is extended or adjusted under 35 U.S.C. 154(b) by 69 days.

(21) Appl. No.: 17/658,433

(22) Filed: Apr. 7, 2022

(65) Prior Publication Data
US 2023/0325962 A1 Oct. 12, 2023

(51) Int. Cl.
*G06T 1/20* (2006.01)
*G06T 15/00* (2011.01)
*G06T 15/80* (2011.01)

(52) U.S. Cl.
CPC ............. *G06T 1/20* (2013.01); *G06T 15/005* (2013.01); *G06T 15/80* (2013.01)

(58) Field of Classification Search
CPC G06T 1/20; G06T 1/60; G06T 15/005; G06T 15/80
USPC ................................................. 345/426, 501
See application file for complete search history.

(56) References Cited

U.S. PATENT DOCUMENTS 10,127,626 B1 * 11/2018 Ostby ...................... G06T 1/60
2012/0213435 A1 * 8/2012 Donovan ............. H04N 19/186
382/166

2017/0024848 A1 * 1/2017 Harris ....................... G06F 8/41
2018/0129499 A1 * 5/2018 Østby .................... G06F 9/3887
2018/0232846 A1 * 8/2018 Gruber .................. G06T 15/005
2018/0239606 A1   8/2018 Mantor et al.

OTHER PUBLICATIONS

Gong X., et al., "HAWS: Accelerating GPU Wavefront Execution through Selective Out-of-order Execution", ACM Transactions on Architecture and Code Optimization, Association for Computing Machinery, US, vol. 16, No. 2, Apr. 18, 2019, pp. 1-22, XP058430320, ISSN: 1544-3566, abstract paragraph [001.]—paragraph [003.] paragraph [004.].
International Search Report and Written Opinion—PCT/US2023/015797—ISA/EPO—dated Jun. 6, 2023.

* cited by examiner

*Primary Examiner* — Jacinta M Crawford
(74) *Attorney, Agent, or Firm* — Procopio, Cory, Hargreaves & Savitch

(57) ABSTRACT

This disclosure provides systems, devices, apparatus, and methods, including computer programs encoded on storage media, for GPU wave-to-wave optimization. A graphics processor may execute a shader program for a first wave associated with a draw call or a compute kernel. The graphics processor may identify at least one first indication for the first wave associated with the draw call or the compute kernel. The graphics processor may store the at least one first indication for the first wave to a memory location. The graphics processor may execute the shader program for at least one second wave associated with the draw call or the compute kernel. The execution of the shader program for the at least one second wave may be based on the shader program for the at least one second wave reading the memory location to retrieve the at least one first indication.

30 Claims, 8 Drawing Sheets

300 / 310

```
 1  void main()
 2  {
 3    vec4 color;
 4    vec4 normal;
 5    vec4 light;
 6    vec4 reflection;
 7    vec4 color_tex = texture( texture_unit0, out_texcoord0);
 8    vec4 normal_tex = texture( texture_unit1, out_texcoord0);
 9    vec4 light_tex = texture( texture_unit2, out_texcoord0);
10    vec4 reflection_tex = texture( texture_unit3, out_texcoord0);
11    color = color_tex;
12    normal = normal_tex;
13    light = light_tex;
14    reflection = reflection_tex;
15    vec3 ambiLightCol = vec3(0.0/255.0, 30.0/255.0, 50.0/255.0);
16    light.xyz += color.xyz * ambiLightCol;
17    light = mix( light, reflection, reflection.a);
18    light = mix( light, color, normal.a);
19    frag_color = light;
20    frag_color.a = normal.a;
21  }
```

340

```
 1  void main()
 2  {
 3    vec4 color;
 4    vec4 normal;
 5    vec4 light;
 6    vec4 reflection;
 7    vec4 normal_tex = texture( texture_unit1, out_texcoord0);
 8    normal = normal_tex;
 9    vec4 color_tex = normal.a==0 ? vec4(0,0,0,0) : texture( texture_unit0, out_texcoord0);
10    color = color_tex;
11    if( 1.0 - normal.a == 0.0 )
12      light = color
13    }else{
14      vec4 light_tex = texture( texture_unit2, out_texcoord0);
15      vec4 reflection_tex = texture( texture_unit3, out_texcoord0);
16      light = light_tex;
17      reflection = reflection_tex;
18      vec3 ambiLightCol = vec3(0.0/255.0, 30.0/255.0, 50.0/255.0);
19      light.xyz += color.xyz * ambiLightCol;
20      light = mix( light, reflection, reflection.a);
21      light = mix( light, color, normal.a);
22    }
23    frag_color = light;
24    frag_color.a = normal.a;
25  }
```

370

☐ normal.a == 0  372
▨ normal.a == 1  374
▦ normal.a == other values  376

FIG. 3

```
1   void main()
2   {
3       vec4 color;
4       vec4 normal;
5       vec4 light;
6       vec4 reflection;
7       vec4 normal_tex = texture( texture_unit1, out_texcoord0);
8       normal = normal_tex;
9       if ((ALPHA_HINT == 0.0) || (ALPHA_HINT == 1.0))
10      {
11          if ALPHA_HINT == 0.0)
12          if (normal.a==0.0)
13          {
14              color = vec4(0,0,0,0);
15                          goto  CONT;
16          }
17          } else
18          {
19              if (normal.a == 1.0 )
20              {
21                  color = texture(texture_unit0, out_texcoord0);
22                  light = color;
23                              goto END;
24              }
25          }
26      };
27      color = texture(texture_unit0, out_texcoord0);
28      CONT: vec4 light_tex = texture( texture_unit2, out_texcoord0);
29      vec4 reflection_tex = texture( texture_unit3, out_texcoord0);
30      light = light_tex;
31      reflection = reflection_tex;
32      vec3 ambiLightCol = vec3(0.0/255.0, 30.0/255.0, 50.0/255.0);
33      light.xyz += color.xyz * ambiLightCol;
34      light = mix( light, reflection, reflection.a);
35      light = mix( light, color, normal.a);
36      END: ALPHA_HINT = normal.a
37      frag_color = light;
38      frag_color.a = normal.a;
39  }
```

FIG. 4

GPU WAVE-TO-WAVE OPTIMIZATION

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address the optimization of the data dependent control flow within a shader executed at a GPU. There is a need for improved inter-wave communication techniques for optimizing the data dependent control flow within a shader.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may execute a shader program for a first wave associated with a draw call or a compute kernel. The apparatus may identify at least one first indication for the first wave associated with the draw call or the compute kernel. The apparatus may store the at least one first indication for the first wave to a memory location. The apparatus may execute the shader program for at least one second wave associated with the draw call or the compute kernel. The execution of the shader program for the at least one second wave may be based on the shader program for the at least one second wave reading the memory location to retrieve the at least one first indication. The execution of the shader program for the at least one second wave may include selecting an execution path based on the at least one first indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 is a diagram illustrating various aspects associated with a shader program for an example scene including a blending operation.

FIG. 4 is a diagram illustrating example instructions associated with a shader program including a blending operation in accordance with one or more techniques of this disclosure.

DETAILED DESCRIPTION

Figure 1:
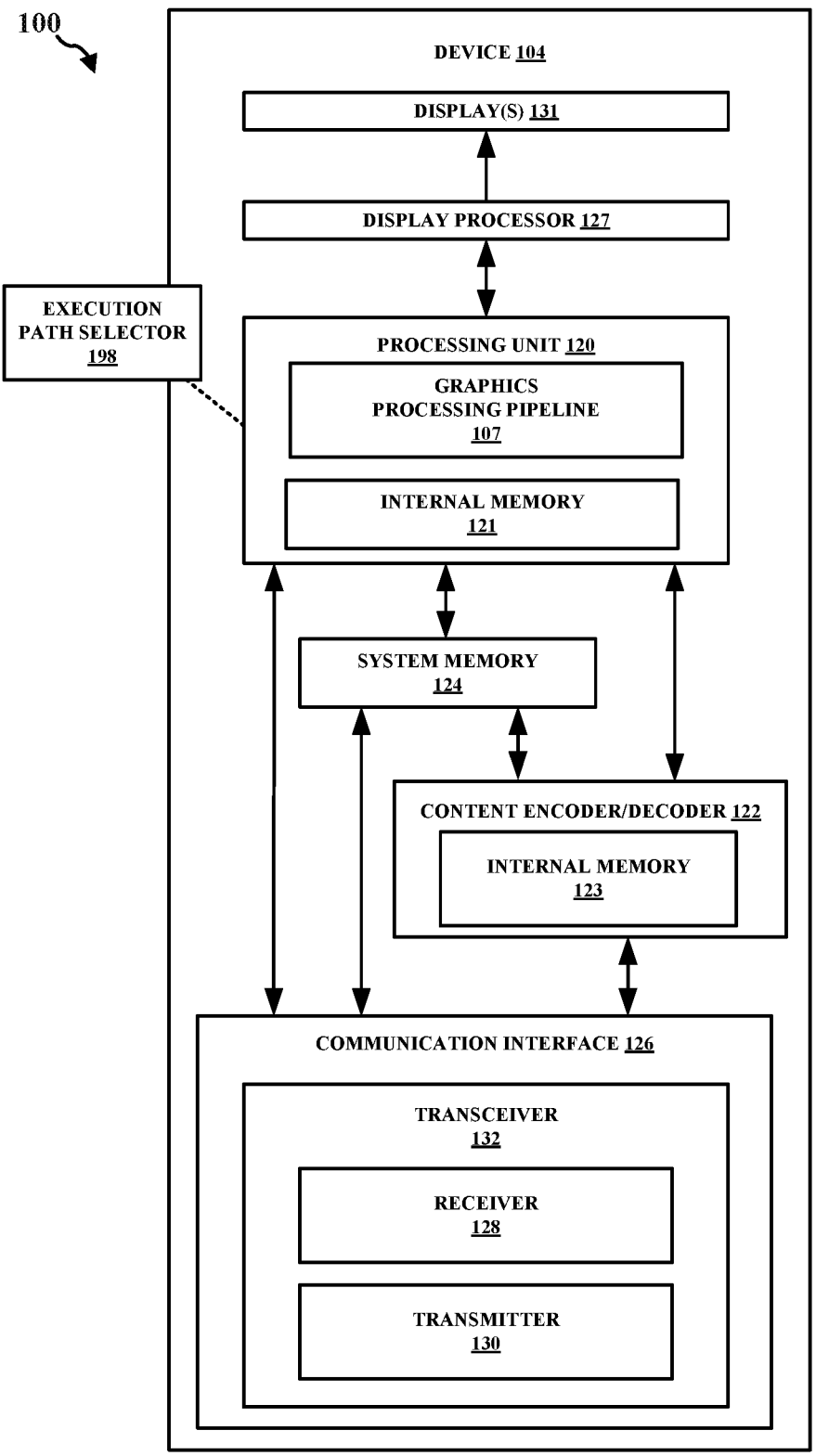
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

The optimal order of operations within a shader may often be data dependent and not known at compile time. This may be especially true for texture blending or masking operations, where, for example, whether a second texture needs to be fetched is a function of (dependent upon) the data of a first texture or some other data. The compiler (e.g., a program that may convert instructions into a machine code or a lower-level form so that they can be read and executed by a GPU) may have two choices when compiling a shader program (e.g., a program for one or more programmable stages of the rendering pipeline) and such an operation is encountered. The first approach may be to fetch both textures and perform operations without regard to the data. This approach may be associated with a high performance for general cases (e.g., where the two textures both indeed need to be fetched and are actually blended for the final output). However, for non-general cases (e.g., where, based on certain data, at least one texture does not actually need to be fetched because it is not actually blended for the final output), fetching both textures and performing operations without regard to the data may be associated with unneeded use of bandwidth and/or arithmetic logic units (ALUs) the use of which may otherwise be avoided if the data is taken into account. The second approach may be to fetch a first texture and then make a decision dependent on the data of the first texture or some other data as to whether a second texture is to be fetched. The data of the first texture or some other data upon which the decision is dependent may be referred to as predicates. With this approach, the use of bandwidth and/or ALUs may be optimal or optimized (e.g., unneeded use may be avoided). However, this approach may be associated with an overall performance penalty, especially for the general cases (e.g., where the two textures both indeed need to be fetched and are actually blended for the final output, and therefore no bandwidth/ALU saving is possible anyway), due to the serialized dependency.

It may be difficult for the compiler to choose the right approach when producing the shader program because the data (including data of the textures or some other data) may be unknown at compile time, especially when, depending on the actual data, the right approach may not even be uniform within a given shader call.

In one or more configurations, a compiler may produce a shader program where the instructions for both approaches, which may correspond to different execution paths in the shader program, may be included in the compiled code of the shader program. Further, the compiler may include instructions in the compiled shader program such that during execution of the shader program for a wave (a wave may be a group of threads that may execute in lockstep using the same Program Counter in a single instruction, multiple data (SIMD) type computing device), a hint (indication) of the data that may inform the optimal selection of an execution path may be stored at a memory location (e.g., a constant store, a constant buffer, a system memory, a local memory, etc.) and may be read at the execution of the shader program for a subsequent wave. The compiled shader program may also include instructions such that the execution path taken at the execution of the shader program for the subsequent wave may be based on the hint (indication) left by the execution of the shader program for the previous wave. The hint (indication) from the execution of the shader program for one wave may inform the optimal selection of an execution path for the execution of the shader program for a subsequent wave because data associated with temporally adjacent waves may likely be the same or be correlated. In other words, it is likely that the optimal execution paths for two or more temporally adjacent waves may be the same. Therefore, based on the hint (indication) left by the execution of the shader program for the previous wave, an optimal execution path corresponding to the optimal approach may be used at the execution of the shader program for the subsequent wave.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include an execution path selector 198 configured to execute a shader program for a first wave associated with a draw call (a draw call may be a command to render a group of primitives using a given render state (such as "Render Target" or "Texture Sources")) or a compute kernel (a compute kernel may be a program defined by a compute application program interface (API)). The execution path selector 198 may be configured to identify at least one first indication for the first wave associated with the draw call or the compute kernel. The execution path selector 198 may be configured to store the at least one first indication for the first wave to a memory location. The execution path selector 198 may be configured to execute the shader program for at least one second wave associated with the draw call or the compute kernel. The execution of the shader program for the at least one second wave may be based on the shader program for the at least one second wave reading the memory location to retrieve the at least one first indication. The execution of the shader program for the at least one second wave may include selecting an execution path based on the at least one first indication. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
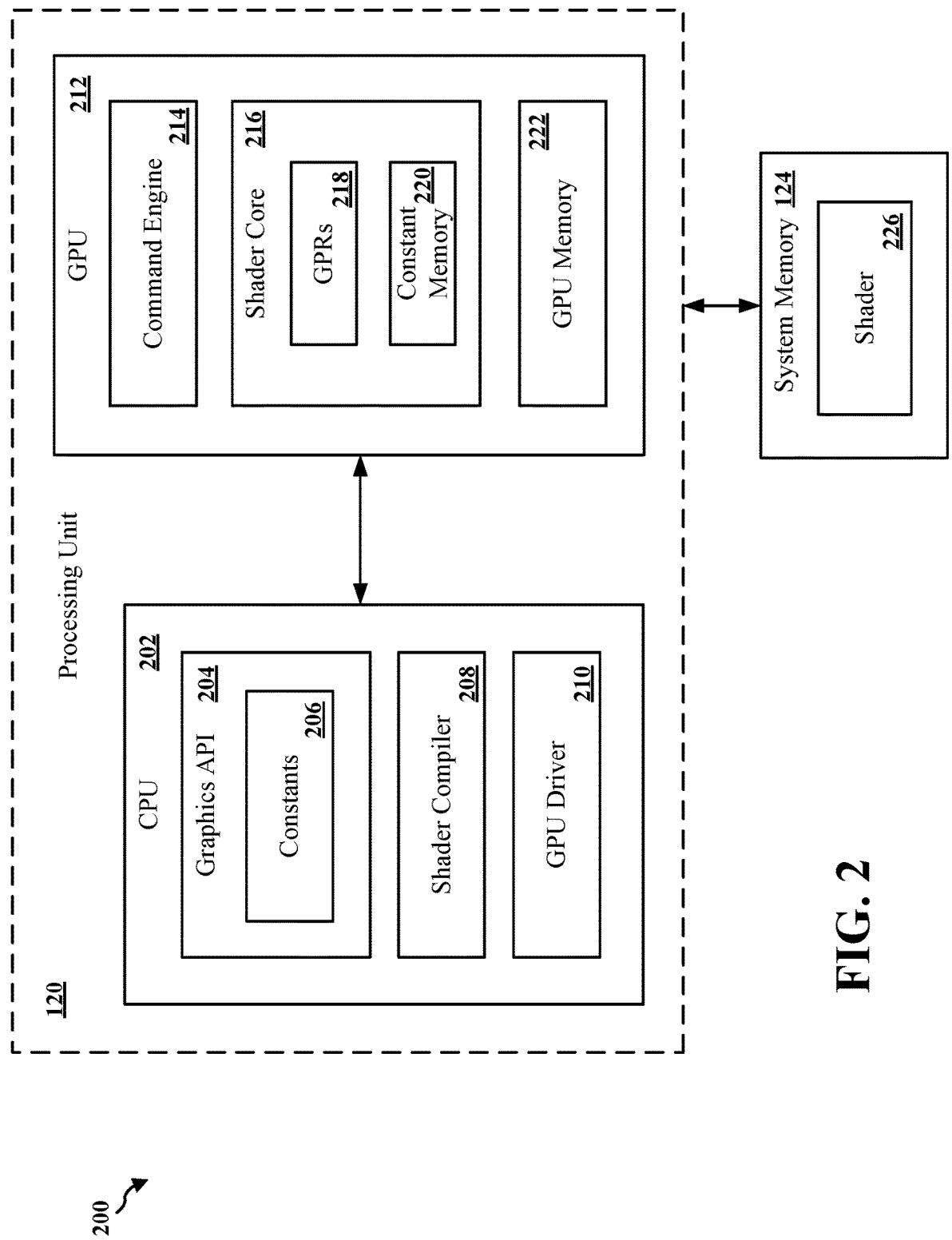
FIG. 2 is a block diagram that illustrates exemplary components for processing data in accordance with one or more techniques of this disclosure.

FIG. 2 is a block diagram 200 that illustrates exemplary components, such as the processing unit 120 and the system memory 124, as may be identified in connection with the exemplary device 104 for processing data. In aspects, the processing unit 120 may include a CPU 202 and a GPU 212. The GPU 212 and the CPU 202 may be formed as an integrated circuit (e.g., a SOC) and/or the GPU 212 may be incorporated onto a motherboard with the CPU 202. Alternatively, the CPU 202 and the GPU 212 may be configured as distinct processing units that are communicatively coupled to each other. For example, the GPU 212 may be incorporated on a graphics card that is installed in a port of the motherboard that includes the CPU 202.

The CPU 202 may be configured to execute a software application that causes graphical content to be displayed (e.g., on the display(s) 131 of the device 104) based on one or more operations of the GPU 212. The software application may issue instructions to a graphics application program interface (API) 204, which may be a runtime program that translates instructions received from the software application into a format that is readable by a GPU driver 210. After receiving instructions from the software application via the graphics API 204, the GPU driver 210 may control an operation of the GPU 212 based on the instructions. For example, the GPU driver 210 may generate one or more command streams that are placed into the system memory 124, where the GPU 212 is instructed to execute the command streams (e.g., via one or more system calls). A command engine 214 included in the GPU 212 is configured to retrieve the one or more commands stored in the command streams. The command engine 214 may provide commands from the command stream for execution by the GPU 212. The command engine 214 may be hardware of the GPU 212, software/firmware executing on the GPU 212, or a combination thereof. Further, the GPU 212 may include a GPU memory 222.

While the GPU driver 210 is configured to implement the graphics API 204, the GPU driver 210 is not limited to being configured in accordance with any particular API. The system memory 124 may store the code for the GPU driver 210, which the CPU 202 may retrieve for execution. In examples, the GPU driver 210 may be configured to allow communication between the CPU 202 and the GPU 212, such as when the CPU 202 offloads graphics or non-graphics processing tasks to the GPU 212 via the GPU driver 210.

The system memory 124 may further store source code for a shader 226. In such configurations, a shader compiler 208 executing on the CPU 202 may compile the source code of the shader 226 to create object code or intermediate code executable by a shader core 216 of the GPU 212 during runtime (e.g., at the time when the shaders 224-226 are to be executed on the shader core 216). In some examples, the shader compiler 208 may pre-compile the shader 226 and store the object code or intermediate code of the shader programs in the system memory 124.

The shader compiler 208 (or in another example the GPU driver 210) executing on the CPU 202 may build a shader program (e.g., the shader 226). The shader compiler 208 may receive instructions to compile the shader(s) 226 from a program executing on the CPU 202. The constants 206 may be defined within the graphics API 204 to be constant across an entire draw call. The shader compiler 208 may utilize instructions such as a shader start to indicate a beginning of the shader 226 and a shader end to indicate an end of the shader 226.

The shader core 216 included in the GPU 212 may include GPRs 218 and constant memory 220. The GPRs 218 may correspond to a single GPR, a GPR file, and/or a GPR bank. Each GPR in the GPRs 218 may store data accessible to a single thread. The software and/or firmware executing on GPU 212 may be a shader program, which may execute on the shader core 216 of GPU 212. The shader core 216 may be configured to execute many instances of the same instructions of the same shader program in parallel. For example, the shader core 216 may execute the shader 226 for each pixel that defines a given shape.

The shader core 216 may transmit and receive data from applications executing on the CPU 202. In examples, constants 206 used for execution of the shader 226 may be stored in a constant memory 220 (e.g., a read/write constant RAM) or the GPRs 218. The shader core 216 may load the constants 206 into the constant memory 220. The constant memory 220 may include memory accessible by all aspects of the shader core 216 rather than just a particular portion reserved for a particular thread such as values held in the GPRs 218.

FIG. 3 is a diagram 300 illustrating various aspects associated with a shader program for an example scene including a blending operation. Herein an instruction may be referred to by the line number associated with the instruction. The diagram 310 shows the instructions of a shader program (or a segment thereof) where the instructions are produced based on the first approach (i.e., fetch both textures and perform operations without regard to the data). In particular, two textures (corresponding to "texture_unit0" and "texture_unit2," respectively) may be fetched at line 7 and line 9, respectively without regard to any actual data. Further, at line 18, the two fetched textures may be blended without regard to any actual data, where the blending operation may be further based on an alpha value ("normal.a"). As explained above, this approach may be associated with a high performance for general cases (e.g., where the two textures both indeed need to be fetched and are actually blended for the final output). However, for non-general cases, fetching both textures and performing operations without regard to the data may be associated with unneeded use of bandwidth and/or ALUs.

For example, the diagram 370 shows a scene including both general and non-general cases. In particular, general cases may correspond to areas 376 in the scene shown in the diagram 370 where the alpha value ("normal.a") is neither 0 nor 1 (e.g., some value between 0 and 1, exclusive). In such general cases, the two textures both may indeed need to be fetched and may actually be blended for the final output. Therefore, for these general cases, using the first approach (e.g., as shown in the diagram 310) may be associated with a high performance. However, the majority of the area of the scene shown in the diagram 370 may correspond an alpha value ("normal.a") of either 0 or 1, and therefore may correspond to non-general cases. For example, areas 372 may correspond an alpha value ("normal.a") of 0, and areas 374 may correspond an alpha value ("normal.a") of 1. For example, if the alpha value ("normal.a") is 0, fetching the texture corresponding to "texture_unit0" at line 7 in the diagram 310 may not actually be needed because the final output may be dominated by the texture corresponding to "texture_unit2." Similarly, if the alpha value ("normal.a") is 1, fetching the texture corresponding to "texture_unit2" at line 9 in the diagram 310 may not actually be needed because the final output may be dominated by the texture corresponding to "texture_unit0." Further, the actual blending operation ("mix( )") may not actually be needed if the alpha value ("normal.a") is 1.

Therefore, the diagram 340 shows the instructions of the same shader program as that shown in the diagram 310 (or a segment thereof) where the instructions are produced based on the second approach (i.e., use predicates to decide whether a texture is to be fetched). In particular, as shown in the diagram 340, if the alpha value ("normal.a") is 0, at line 9 (which is associated with a dependency), the texture corresponding to "texture_unit0" may not actually be fetched (the texture corresponding to "texture_unit2" may be fetched at line 14). Further, if the alpha value ("normal.a") is 1, lines 13 through 22 including the actual "mix( )" operations may be skipped altogether based on the "if" clause at lines 11 and 12 (which is associated with a dependency), and the texture corresponding to "texture_unit2" may not actually be fetched (the texture corresponding to "texture_unit0" may be fetched at line 9). Therefore, based on the instructions shown in the diagram 340, for such non-general cases where the alpha value ("normal.a") is 0 or 1, use of bandwidth and/or ALUs may be avoided. However, for general cases where the alpha value ("normal.a") is neither 0 nor 1, the instructions shown in the diagram 340 may not lead to any saving in bandwidth and/or ALUs because both textures may indeed need to be fetched and the blending operation ("mix( )") may actually need to be performed. Worse still, the instructions shown in the diagram 340 may be associated with an overall performance penalty for such general cases due to the serialized dependencies at lines 9, 11, and 13.

FIG. 4 is a diagram 400 illustrating example instructions associated with a shader program in accordance with one or more techniques of this disclosure. The instructions shown in the diagram 400 may produce the same output as instructions shown in the diagram 310 or the instructions shown in the diagram 340. In particular, when executing the shader program for a wave (e.g., a wave associated with a draw call or a compute kernel (a compute kernel may be a routine compiled for the GPU)), at line 32, the alpha value ("normal.a") may be stored as a hint (indication) into "ALPHA_HINT," the content of which may persist across waves. The location corresponding to "ALPHA_HINT" may be a constant memory (e.g., constant memory 220) location, a memory location, or a buffer location, and may be associated with fast access. Accordingly, the value of the hint (indication) may change from one wave to another wave, and may inform the optimal selection of an execution path for one or more subsequent waves. Furthermore, it should be appreciated that the compiler may control the number of hints (indications) to use.

Accordingly, during the execution of the shader program for the current wave, based on the hint left by the (e.g., immediately) previous wave, if the previous wave corresponds to a non-general case (i.e., the alpha value ("normal.a") for the previous wave is 0 or 1, which may lead to the condition for the "if" clause at line 9 being "true"), whether the present wave corresponds to a same special case as the previous wave (i.e., the alpha value ("normal.a") being the same as in the previous wave: 0 or 1) may be evaluated at lines 10-11 or 15-16. For example, if the alpha values ("normal.a") for both the previous wave and the current wave are 0, line 23 may be skipped based on line 13, and fetching of the texture corresponding to "texture_unit0" may be avoided. Further, if the alpha values ("normal.a") for both the previous wave and the current wave are 1, lines 23 through 31 may be skipped altogether based on line 19. Accordingly, fetching of the texture corresponding to "texture_unit2" at line 24 may be avoided, and the actual blending operations ("mix( )") may be avoided as well. Therefore, if the present wave corresponds to a same special case as the previous wave, unneeded use of bandwidth and/or ALUs may be avoided.

On the other hand, if the previous wave corresponds to a general case (i.e., the alpha value ("normal.a") for the previous wave is neither 0 nor 1, which may lead to the condition for the "if" clause at line 9 being "false"), lines 10 through 22 may be skipped altogether. The remaining instructions, therefore, may be similar to the instructions shown in the diagram 310. Accordingly, both textures may be fetched, and operations (e.g., blending operations) may be performed without regard to the data. Because, unlike a texture fetched during the execution of the shader program for the present wave, the hint (indication) may be a simple value stored at a location with fast access (e.g., the constant memory 220), the performance penalty associated with the dependency at line 9 may be minimal. Therefore, high performance may be achieved for most general cases because if the previous wave corresponds to a general case, the present wave may likely correspond to a general case as well.

Furthermore, in the minority of cases where the hint (which hereinafter may also be referred to as the indication) is incorrect (e.g., the previous wave corresponds to a general case but the present wave corresponds to a non-general case, the previous wave corresponds to a non-general case but the present wave corresponds to a general case, or the previous wave and the present wave correspond to different non-general cases), lines 9 through 22 may be quickly disposed of without changing the value of any variable, and the remaining instructions starting from line 23 may again be similar to the instructions shown in the diagram 310. Therefore, a wrong hint (indication) may not affect the correctness of the program output. Further, because the hint (indication) is expected to be correct in the majority of cases, the unneeded use of bandwidth and/or ALUs as a result of the incorrect hint (indication) may be minimal.

Figure 5:
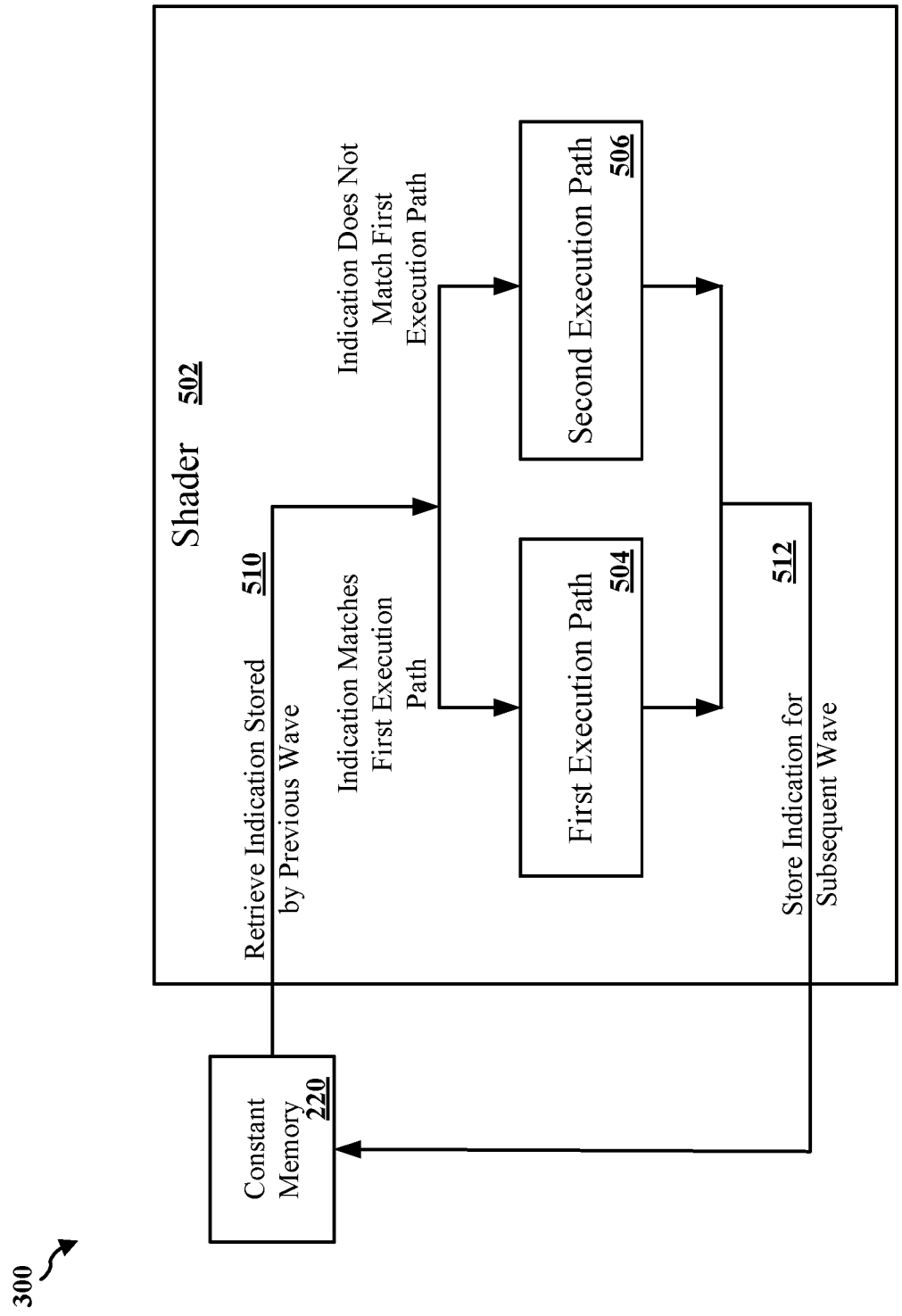
FIG. 5 is a block diagram corresponding to operations associated with executing a shader program in accordance with one or more techniques of this disclosure.

FIG. 5 is a block diagram corresponding to operations associated with executing a shader program in accordance with one or more techniques of this disclosure. During the execution of the shader program 502 for a present wave, at 510, an indication (hint) stored by the (immediately) previous wave may be retrieved from a memory location (e.g., a constant memory 220 location). If the indication (hint) from the previous wave matches a first execution path 504, the execution of the shader program 502 for the present wave may proceed down the first execution path 504. On the other hand, the indication (hint) from the previous wave matches a second execution path 506, the execution of the shader program 502 for the present wave may proceed down the second execution path 506. It may be expected that the indication (hint) from the previous wave may likely be the same as the value of the variable for the present wave. Therefore, if the first execution path 504 and the second execution path 506 are suitably constructed, selecting one of the first execution path 504 or the second execution path 506 for the execution of the shader program 502 for the present wave based on the indication (hint) from the previous wave may lead to the use of an optimal execution path between the first execution path 504 and the second execution path 506. Because the indication (hint) may be retrieved from a memory location with fast access (e.g., the constant memory 220 location), the performance penalty associated with the dependency upon the indication (hint) at the selection of the execution path may be minimal. Thereafter, at 512, an indication (hint) may be stored to the memory location (e.g., the constant memory 220 location) for the benefit of the execution of the shader program 502 for a subsequent wave.

Figure 6:
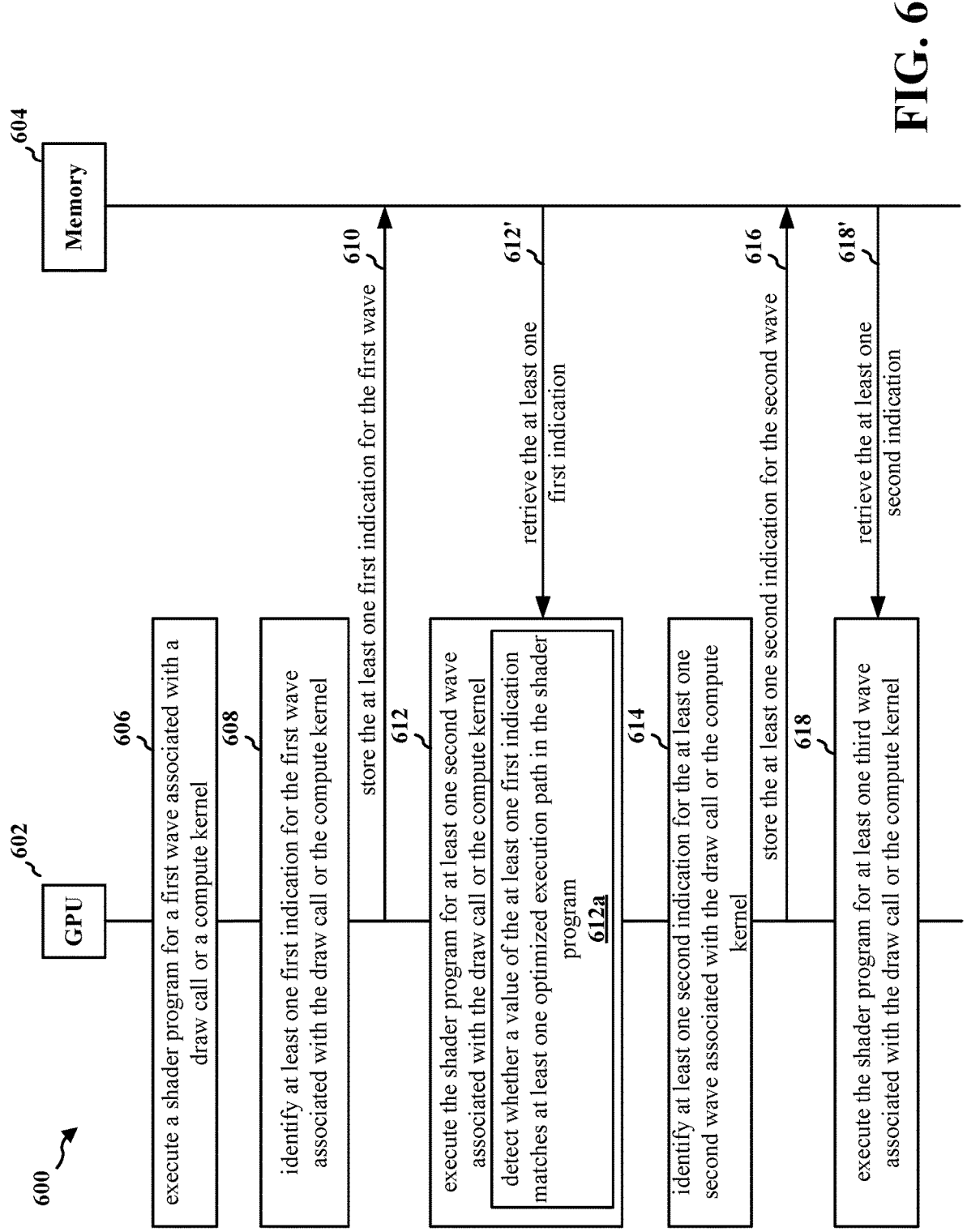
FIG. 6 is a call flow diagram illustrating example communications between a GPU and a memory in accordance with one or more techniques of this disclosure.

FIG. 6 is a call flow diagram 600 illustrating example communications between a GPU 602 and a memory 604 in accordance with one or more techniques of this disclosure. At 606, the GPU 602 may execute a shader program for a first wave associated with a draw call or a compute kernel. In one configuration, the draw call may be associated with a plurality of primitives in a scene. In one configuration, the compute kernel may be associated with a plurality of work items (e.g., a work item may be one execution of multiple parallel executions of a draw call or a compute kernel).

At 608, the GPU 602 may identify at least one first indication for the first wave associated with the draw call or the compute kernel.

In one or more configurations, the at least one first indication for the first wave may be at least one of an alpha value, an angle of reflection, a specularity indication, or a shadow indication. For example, specular (reflective) highlights may typically exist when the normal component of the surface is close to the direction of the eye. Therefore, if the hint used is the difference between the angle of the normal component and the viewing angle (i.e., angle of the normal component—viewing angle), then a hint whose value is close to 0 may indicate that the specularity branch of the code may be executed. As another example, shadows may be determined via a lookup into a shadow map surface that was rendered from the point of view of the light. Then, the "depth" value read may be compared with the (computed) depth value of the currently rendered object to determine if the shadow map matches the currently rendered object. A non-match may indicate a shadow, as that object may not be the object closest to the light source. Therefore, the hint used may be the shadow map depth read. If the depth of the currently rendered object is not close to the value of the stored hint, then it is probable that the current pixel may be in a shadow, and a corresponding branch of the code may be executed.

At 610, the GPU 602 may store the at least one first indication for the first wave to a memory location in a memory 604. In one configuration, the at least one first indication may be stored by a single fiber (a fiber may be a single lane (datum) of execution in a SIMD machine; each wave may include multiple fibers) for the first wave (e.g., a wave may include multiple fibers). In one or more configurations, the memory location may be a local constant storage location.

At 612, the GPU 602 may execute the shader program for at least one second wave associated with the draw call or the compute kernel. The execution of the shader program for the at least one second wave may be based on the shader program for the at least one second wave reading the memory location (e.g., reading a local constant memory location or a buffer) in the memory 604 to retrieve 612' the at least one first indication. The execution of the shader program for the at least one second wave may include selecting an execution path based on the at least one first indication.

In one configuration, the execution of the shader program for the at least one second wave may be after the execution of the shader program for the first wave.

At 612a, the GPU 602 may detect whether a value of the at least one first indication matches at least one optimized execution path (e.g., whether the "ALPHA_HINT" indication from the previous wave corresponds to a same non-general case as the alpha value for the present wave; if yes, certain instructions for texture fetching and blending may be skipped for the present wave, which may correspond to an optimized execution path associated with the non-general case) in the shader program.

In one configuration, the execution of the shader program for the at least one second wave may be optimized if the value of the at least one first indication matches the at least one optimized execution path. In one configuration, the at least one optimized execution path may be associated with at least one of a shader processor of a GPU (e.g., the shader core 216 of the GPU 212) or a compiler of the GPU (e.g., the shader compiler 208 of the GPU 212).

At 614, the GPU 602 may identify at least one second indication for the at least one second wave associated with the draw call or the compute kernel.

At 616, the GPU 602 may store the at least one second indication for the second wave to a memory location in the memory 604.

At 618, the GPU 602 may execute the shader program for at least one third wave associated with the draw call or the compute kernel. The execution of the shader program for the at least one third wave may be based on the shader program for the at least one third wave reading the memory location in the memory 604 to retrieve 618' the at least one second indication. The execution of the shader program for the at least one third wave may include selecting an execution path based on the at least one second indication.

Figure 7:
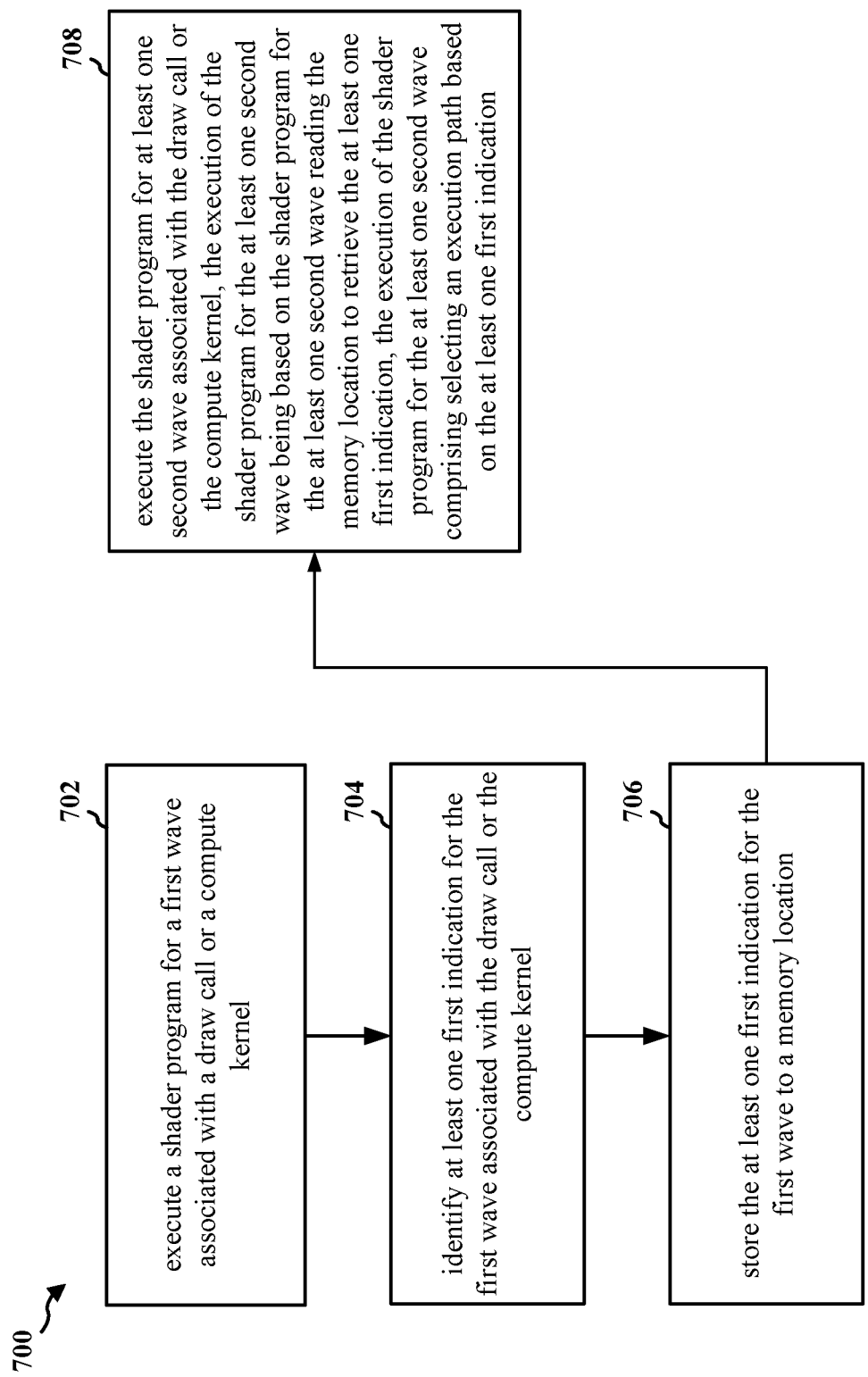
FIG. 7 is a flowchart of an example method of graphics processing in accordance with one or more techniques of this disclosure.

FIG. 7 is a flowchart 700 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-6.

At 702, the apparatus may execute a shader program for a first wave associated with a draw call or a compute kernel. For example, referring to FIG. 6, at 606, the GPU 602 may execute a shader program for a first wave associated with a draw call or a compute kernel. Further, the processing unit 120 in FIG. 1 may perform the operation 702.

At 704, the apparatus may identify at least one first indication for the first wave associated with the draw call or the compute kernel. For example, referring to FIG. 6, at 608, the GPU 602 may identify at least one first indication for the first wave associated with the draw call or the compute kernel. Further, the processing unit 120 in FIG. 1 may perform the operation 704.

At 706, the apparatus may store the at least one first indication for the first wave to a memory location. For example, referring to FIG. 6, at 610, the GPU 602 may store the at least one first indication for the first wave to a memory location in the memory 604. Further, the processing unit 120 in FIG. 1 may perform the operation 706.

At 708, the apparatus may execute the shader program for at least one second wave associated with the draw call or the compute kernel. The execution of the shader program for the at least one second wave may be based on the shader program for the at least one second wave reading the memory location to retrieve the at least one first indication. The execution of the shader program for the at least one second wave may include selecting an execution path based on the at least one first indication. For example, referring to FIG. 6, at 612, the GPU 602 may execute the shader program for at least one second wave associated with the draw call or the compute kernel. Further, the processing unit 120 in FIG. 1 may perform the operation 708.

Figure 8:
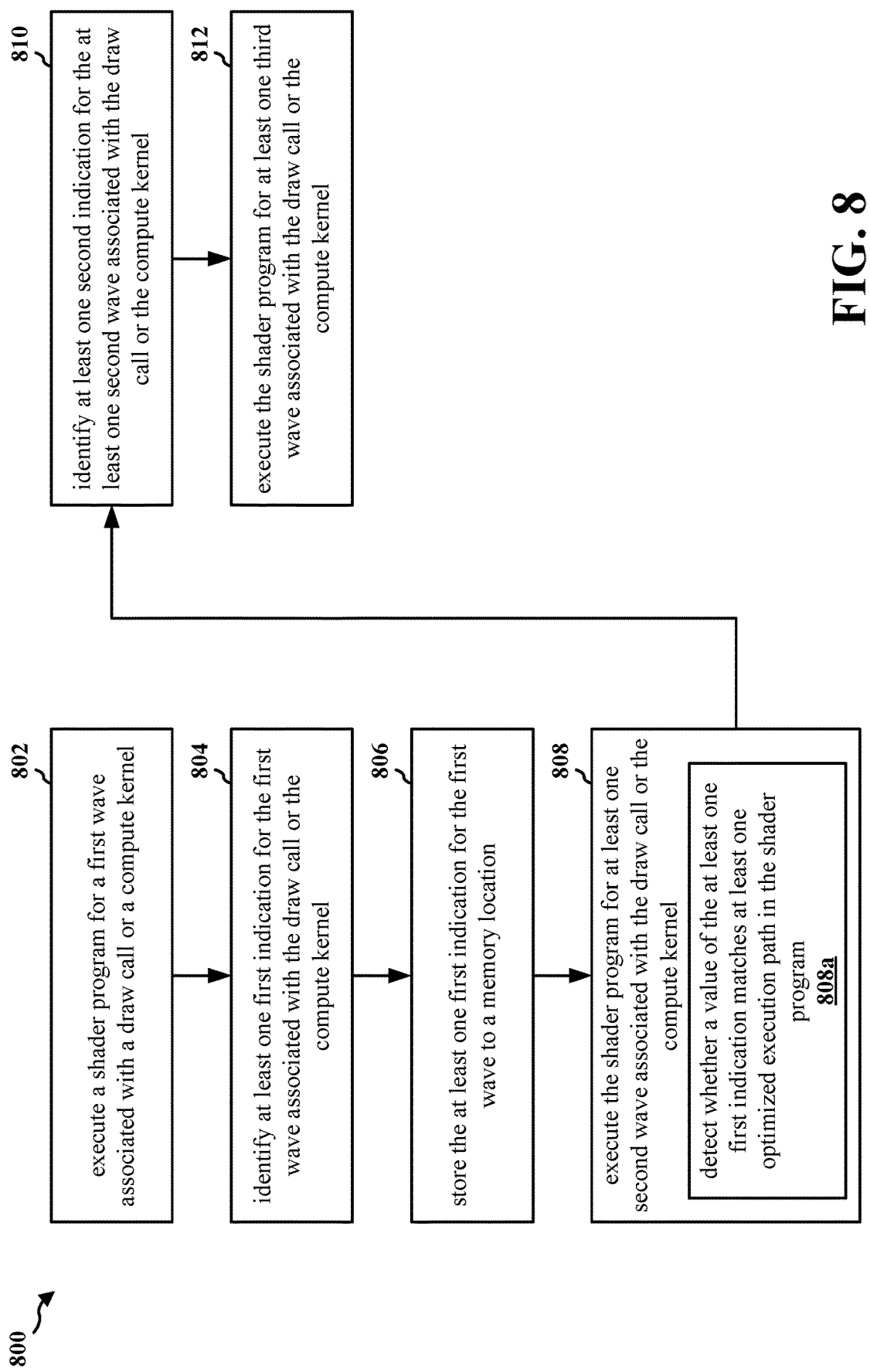
FIG. 8 is a flowchart of an example method of graphics processing in accordance with one or more techniques of this disclosure.

FIG. 8 is a flowchart 800 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-6.

At 802, the apparatus may execute a shader program for a first wave associated with a draw call or a compute kernel. For example, referring to FIG. 6, at 606, the GPU 602 may execute a shader program for a first wave associated with a draw call or a compute kernel. Further, the processing unit 120 in FIG. 1 may perform the operation 802.

At 804, the apparatus may identify at least one first indication for the first wave associated with the draw call or the compute kernel. For example, referring to FIG. 6, at 608, the GPU 602 may identify at least one first indication for the first wave associated with the draw call or the compute kernel. Further, the processing unit 120 in FIG. 1 may perform the operation 804.

At 806, the apparatus may store the at least one first indication for the first wave to a memory location. For example, referring to FIG. 6, at 610, the GPU 602 may store the at least one first indication for the first wave to a memory location in the memory 604. Further, the processing unit 120 in FIG. 1 may perform the operation 806.

At 808, the apparatus may execute the shader program for at least one second wave associated with the draw call or the compute kernel. The execution of the shader program for the at least one second wave may be based on the shader program for the at least one second wave reading the memory location to retrieve the at least one first indication. The execution of the shader program for the at least one second wave may include selecting an execution path based on the at least one first indication. For example, referring to FIG. 6, at 612, the GPU 602 may execute the shader program for at least one second wave associated with the draw call or the compute kernel. Further, the processing unit 120 in FIG. 1 may perform the operation 808.

In one configuration, the draw call may be associated with a plurality of primitives in a scene.

In one configuration, the compute kernel may be associated with a plurality of work items.

In one configuration, the at least one first indication for the first wave may be at least one of an alpha value, an angle of reflection, a specularity indication, or a shadow indication.

In one configuration, the at least one first indication may be stored by a single fiber for the first wave.

In one configuration, the memory location may be a local constant storage location.

In one configuration, at 808*a*, the apparatus may detect whether a value of the at least one first indication matches at least one optimized execution path in the shader program. For example, referring to FIG. 6, at 612*a*, the GPU 602 may detect whether a value of the at least one first indication matches at least one optimized execution path in the shader program. Further, the processing unit 120 in FIG. 1 may perform the operation 808*a*.

In one configuration, the execution of the shader program for the at least one second wave may be optimized if the value of the at least one first indication matches the at least one optimized execution path.

In one configuration, the at least one optimized execution path may be associated with at least one of a shader processor of a GPU or a compiler of the GPU.

In one configuration, the execution of the shader program for the at least one second wave may be after the execution of the shader program for the first wave.

In one configuration, at 810, the apparatus may identify at least one second indication for the at least one second wave associated with the draw call or the compute kernel. For example, referring to FIG. 6, at 614, the GPU 602 may identify at least one second indication for the at least one second wave associated with the draw call or the compute kernel. Further, the processing unit 120 in FIG. 1 may perform the operation 810.

At 812, the apparatus may execute the shader program for at least one third wave associated with the draw call or the compute kernel. The execution of the shader program for the at least one third wave may be based on the at least one second indication. For example, referring to FIG. 6, at 618, the GPU 602 may execute the shader program for at least one third wave associated with the draw call or the compute kernel. Further, the processing unit 120 in FIG. 1 may perform the operation 812.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for executing a shader program for a first wave associated with a draw call or a compute kernel. The apparatus may further include means for identifying at least one first indication for the first wave associated with the draw call or the compute kernel. The apparatus may further include means for storing the at least one first indication for the first wave to a memory location. The apparatus may further include means for executing the shader program for at least one second wave associated with the draw call or the compute kernel. The execution of the shader program for the at least one second wave may be based on the shader program for the at least one second wave reading the memory location to retrieve the at least one first indication. The execution of the shader program for the at least one second wave may include selecting an execution path based on the at least one first indication.

In one configuration, the draw call may be associated with a plurality of primitives in a scene. In one configuration, the compute kernel may be associated with a plurality of work items. In one configuration, the at least one first indication for the first wave may be at least one of an alpha value, an angle of reflection, a specularity indication, or a shadow indication. In one configuration, the at least one first indication may be stored by a single fiber for the first wave. In one configuration, the memory location may be a local constant storage location. In one configuration, the apparatus may further include means for detecting whether a value of the at least one first indication matches at least one optimized execution path in the shader program. In one configuration, the execution of the shader program for the at least one second wave may be optimized if the value of the at least one first indication matches the at least one optimized execution path. In one configuration, the at least one optimized execution path may be associated with at least one of a shader processor of a GPU or a compiler of the GPU. In one configuration, the execution of the shader program for the at least one second wave may be after the execution of the shader program for the first wave. In one configuration, the apparatus may further include means for identifying at least one second indication for the at least one second wave associated with the draw call or the compute kernel. The apparatus may further include means for executing the shader program for at least one third wave associated with the draw call or the compute kernel. The execution of the shader program for the at least one third wave may be based on the at least one second indication.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to execute a shader program for a first wave associated with a draw call or a compute kernel; identify at least one first indication for the first wave associated with the draw call or the compute kernel; store the at least one first indication for the first wave to a memory location; and execute the shader program for at least one second wave associated with the draw call or the compute kernel, the execution of the shader program for the at least one second wave being based on the shader program for the at least one second wave reading the memory location to retrieve the at least one first indication, the execution of the shader program for the at least one second wave including selecting an execution path based on the at least one first indication.

Aspect 2 may be combined with aspect 1 and includes that the draw call is associated with a plurality of primitives in a scene.

Aspect 3 may be combined with aspect 1 and includes that the compute kernel is associated with a plurality of work items.

Aspect 4 may be combined with any of aspects 1-3 and includes that the at least one first indication for the first wave is at least one of: an alpha value, an angle of reflection, a specularity indication, or a shadow indication.

Aspect 5 may be combined with any of aspects 1-4 and includes that the at least one first indication is stored by a single fiber for the first wave.

Aspect 6 may be combined with any of aspects 1-5 and includes that the memory location is a local constant storage location.

Aspect 7 may be combined with any of aspects 1-6, the at least one processor being further configured to: detect whether a value of the at least one first indication matches at least one optimized execution path in the shader program.

Aspect 8 may be combined with aspect 7 and includes that the execution of the shader program for the at least one second wave is optimized if the value of the at least one first indication matches the at least one optimized execution path.

Aspect 9 may be combined with any of aspects 7-8 and includes that the at least one optimized execution path is associated with at least one of a shader processor of a GPU or a compiler of the GPU.

Aspect 10 may be combined with any of aspects 1-9 and includes that the execution of the shader program for the at least one second wave is after the execution of the shader program for the first wave.

Aspect 11 may be combined with any of aspects 1-10, the at least one processor being further configured to: identify at least one second indication for the at least one second wave associated with the draw call or the compute kernel; and execute the shader program for at least one third wave associated with the draw call or the compute kernel, the execution of the shader program for the at least one third wave being based on the at least one second indication.

Aspect 12 may be combined with aspect 1-11 and includes that the apparatus is a wireless communication device, further including at least one of an antenna or a transceiver coupled to the at least one processor.

Aspect 13 a method of graphics processing for implementing any of aspects 1-12.

Aspect 14 is an apparatus for graphics processing including means for implementing a method as in any of aspects 1-12.

Aspect 15 is a computer-readable medium storing computer executable code, the code when executed by at least one processor causes the at least one processor to implement a method as in any of aspects 1-12.

Various aspects have been described herein. These and other aspects are within the scope of the following claims.

What is claimed is:

1. An apparatus for graphics processing, comprising:
a memory; and
at least one processor coupled to the memory and configured to:
execute, based on an execution path of a plurality of execution paths, a shader program for a first wave associated with a draw call or a compute kernel, wherein the shader program comprises the plurality of execution paths, and wherein to execute the shader program for the first wave, the at least one processor is further configured to;
identify at least one first indication associated with the execution path; and
store the at least one first indication for the first wave to a memory location; and
execute, based on the execution path of the plurality of execution paths, the shader program for at least one second wave associated with the draw call or the compute kernel, wherein to execute the shader program for the at least one second wave, the at least one processor is further configured to:
retrieve the at least one first indication from the memory location; and
select the execution path based on the at least one first indication.

2. The apparatus of claim 1, wherein the draw call is associated with a plurality of primitives in a scene.

3. The apparatus of claim 1, wherein the compute kernel is associated with a plurality of work items.

4. The apparatus of claim 1, wherein the at least one first indication is at least one of: an alpha value, an angle of reflection, a specularity indication, or a shadow indication.

5. The apparatus of claim 1, wherein the at least one first indication is stored by a single fiber for the first wave.

6. The apparatus of claim 1, wherein the memory location is a local constant storage location.

7. The apparatus of claim 1, the at least one processor being further configured to:
detect whether a value of the at least one first indication matches at least one optimized execution path in the shader program.

8. The apparatus of claim 7, wherein the execution of the shader program for the at least one second wave is optimized if the value of the at least one first indication matches the at least one optimized execution path.

9. The apparatus of claim 7, wherein the at least one optimized execution path is associated with at least one of a shader processor of a graphics processing unit (GPU) or a compiler of the GPU.

10. The apparatus of claim 1, wherein the execution of the shader program for the at least one second wave is after the execution of the shader program for the first wave.

11. The apparatus of claim 1, the at least one processor being further configured to:
execute, based on the execution path of the plurality of execution paths, the shader program for at least one third wave associated with the draw call or the compute kernel, wherein to execute the shader program for the at least one third wave, the at least one processor is further configured to:
determine the at least one indication is incorrect for the third wave
identify at least one second indication associated with a second execution path of the plurality of execution paths; and
store the at least one second indication to the memory location.

12. The apparatus of claim 1, further comprising at least one of an antenna or a transceiver coupled to the at least one processor, wherein the apparatus is a wireless communication device.

13. A method of graphics processing, comprising:
executing, based on an execution path of a plurality of execution paths, a shader program for a first wave associated with a draw call or a compute kernel, wherein the shader program comprises the plurality of execution paths, and wherein executing the shader program for the first wave comprises;
identifying at least one first indication associated with the execution path; and
storing the at least one first indication to a memory location; and
executing, based on the execution path of the plurality of execution paths, the shader program for at least one second wave associated with the draw call or the compute kernel, wherein executing the shader program for the at least one second wave comprises:
retrieving the at least one first indication from the memory location; and
selecting the execution path based on the at least one first indication.

14. The method of claim 13, wherein the draw call is associated with a plurality of primitives in a scene.

15. The method of claim 13, wherein the compute kernel is associated with a plurality of work items.

16. The method of claim 13, wherein the at least one first indication is at least one of: an alpha value, an angle of reflection, a specularity indication, or a shadow indication.

17. The method of claim 13, wherein the at least one first indication is stored by a single fiber for the first wave.

18. The method of claim 13, wherein the memory location is a local constant storage location.

19. The method of claim 13, further comprising:
detecting whether a value of the at least one first indication matches at least one optimized execution path in the shader program.

20. The method of claim 19, wherein the execution of the shader program for the at least one second wave is optimized if the value of the at least one first indication matches the at least one optimized execution path.

21. The method of claim 19, wherein the at least one optimized execution path is associated with at least one of a shader processor of a graphics processing unit (GPU) or a compiler of the GPU.

22. The method of claim 13, wherein the execution of the shader program for the at least one second wave is after the execution of the shader program for the first wave.

23. The method of claim 13, further comprising:
executing, based on the execution path of the plurality of execution paths, the shader program for at least one third wave associated with the draw call or the compute kernel, wherein executing the shader program for the at least one third wave comprises:
determining the at least one indication is incorrect for the third wave;

identifying at least one second indication associated with a second execution path of the plurality of execution paths; and storing the at least one second indication to the memory location.

24. A non-transitory computer-readable medium storing computer executable code, the code when executed by at least one processor, causes the at least one processor to:

execute, based on an execution path of a plurality of execution paths, a shader program for a first wave associated with a draw call or a compute kernel, wherein the shader program comprises the plurality of execution paths, and wherein to execute the shader program for the first wave, the code further causes the at least one processor to;

identify at least one first indication associated with the execution path; and store the at least one first indication for the first wave to a memory location; and execute, based on the execution path of the plurality of execution paths, the shader program for at least one second wave associated with the draw call or the compute kernel, wherein to execute of the shader program for the at least one second wave, the code further causes the at least one processor to:

retrieve the at least one first indication from the memory location; and select the execution path based on the at least one first indication.

25. The non-transitory computer-readable medium of claim 24, wherein the draw call is associated with a plurality of primitives in a scene.

26. The non-transitory computer-readable medium of claim 24, wherein the compute kernel is associated with a plurality of work items.

27. The non-transitory computer-readable medium of claim 24, wherein the at least one first indication is at least one of: an alpha value, an angle of reflection, a specularity indication, or a shadow indication.

28. The non-transitory computer-readable medium of claim 24, wherein the at least one first indication is stored by a single fiber for the first wave.

29. The non-transitory computer-readable medium of claim 24, wherein the memory location is a local constant storage location.

30. The non-transitory computer-readable medium of claim 24, the code further causing the at least one processor to:

detect whether a value of the at least one first indication matches at least one optimized execution path in the shader program.

* * * * *